Aug. 21, 1934.  H. G. M. FISCHER  1,970,693
REGENERATION OF DOCTOR SLUDGE
Filed April 29, 1931   2 Sheets-Sheet 2
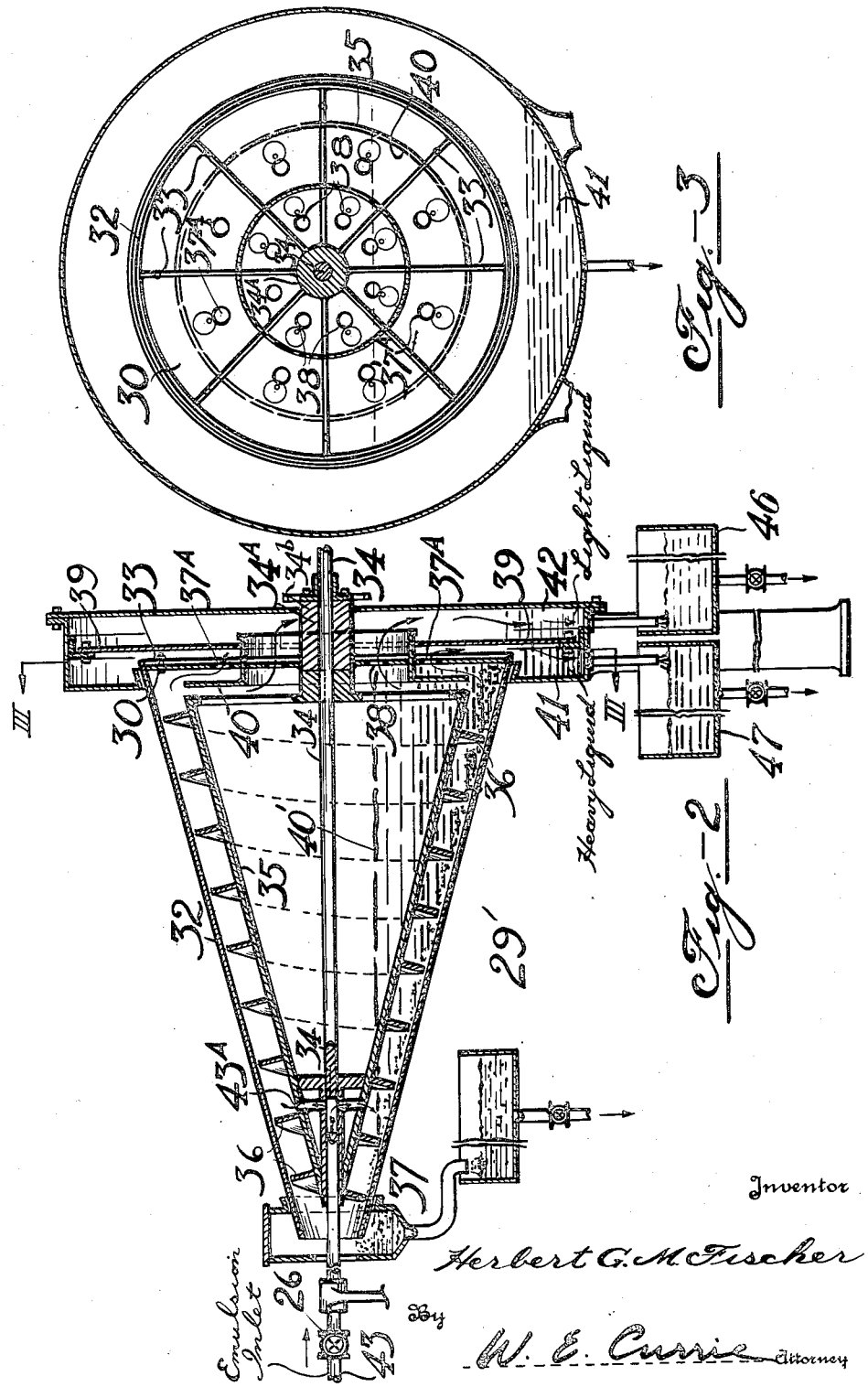

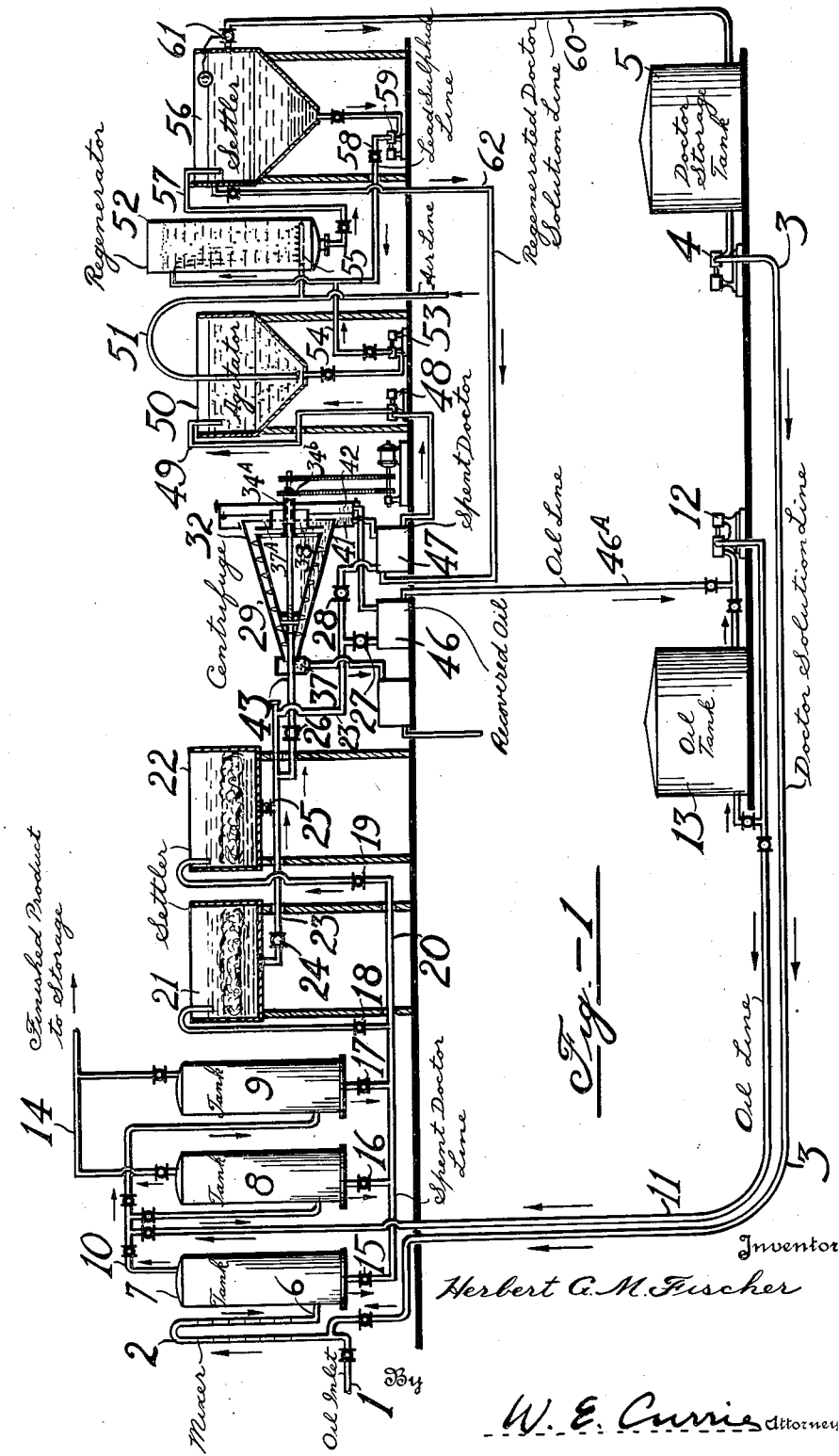

– Patented Aug. 21, 1934

1,970,693

UNITED STATES PATENT OFFICE 1,970,693

REGENERATION OF DOCTOR SLUDGE

Herbert G. M. Fischer, Westfield, N. J., assignor to Standard Oil Development Company, a corporation of Delaware Application April 29, 1931, Serial No. 533,616

9 Claims. (Cl. 196—1)

This invention relates to improvements in the separation of ingredients found in emulsions formed in the treatment of petroleum crude oils or distillates. Primarily the emulsions herein specified are formed by the so-called doctor sweetening, which consists in treating sour oils with sodium plumbite solution, together with or followed by sulphur. A by-product is obtained (so called blackstrap) which is essentially an emulsion of caustic soda, the oil under treatment, and finely divided lead sulphide.

The emulsion is generally so stable as to remain unchanged over a considerable period of time and only a small amount of the oil contained in the emulsion can be separated by settling. The result is that, during the subsequent regenerating step, which consists in contacting the black strap and caustic soda with air, a great deal of the oil is lost.

The recovery of the oil is accomplished according to this invention by continuously centrifuging prior to regeneration, whereby a two or three way separation is attained. Oil together with or without lead sulphide, and caustic soda together with lead sulphide are separated using a low centrifugal force, or oil, caustic soda and lead sulphide are separated, all three components in an essentially distinct separation using a high centrifugal force.

For illustration of one of the various forms the invention may take, reference is to be had to the accompanying drawings, in which Fig. 1 is a somewhat diagrammatic representation in elevation of apparatus adapted for the practice of the improved process of the invention;

Fig. 2 is an elevation partly in section of one form of a centrifuge suitable for use in the apparatus illustrated in Fig. 1, and Fig. 3 is a transverse section on line III—III, Fig. 2.

In the drawings 1 denotes a line through which oil is passed into the mixer 2. The mixer 2 is an inverted U-shape column containing a series of baffles alternately joined to opposite sides of the column so that the liquids flowing through the column follow a tortuous path and are intimately mixed. Pipe line 3 together with pump 4 is used to pass the doctor solution from the doctor storage tank 5 into the mixer 2. The latter is connected with the doctor treating and settling tank 7 by means of inlet 6. Pipe line 10 is used to pass the oil from the doctor settling tank 7 to doctor settling tanks 8 and 9. Pipe line 11 together with pump 12 is used to convey oil from tank 13 to pipe line 10 and doctor settling tanks 8 and 9. Pipe line 14 is arranged to remove oil from doctor settling tanks 8 and 9 to storage as finished product. A suitable draw-off with valves 15, 16, 17, 18 and 19 on pipe line 20 is used to convey the spent doctor solution from doctor settling tanks 7, 8 and 9 to the preliminary spent doctor settlers 21 and 22. Pipe line 23 with suitable valves 24 and 25 is used to withdraw the spent doctor solution together with the emulsion and separated oil from preliminary settlers 21 and 22. Valves 26, 27 and 28 are arranged on pipe line 23 to be used as means for controlling the separation of spent doctor solution, oil and emulsion. The separated oil is run into tank 46, the separated spent doctor solution into tank 47 and the emulsion into centrifuge 29.

The centrifuge 29, illustrated in detail in Fig. 2, comprises a bowl 32 supported by web 33 and rotatably mounted on shaft 34. The element 35 is keyed to the shaft 34 and is provided at its outer surface with extension 36 which is helical in form and extends approximately to the inner surface of the bowl 32. The central portion of the bowl is conical in form tapering towards the shaft at one end. The other end of the bowl 32 is provided with a circular end plate 30 joined to the supporting web 33 and extending inwardly from the periphery of the bowl and enclosing the end of the bowl. The tapered end of the bowl is continued until it approaches nearer to the shaft 34 than the inner edge of the circular end plate 30. The bowl 32 is provided with a baffle 40 joined to the circular end plate 30 below the liquid level 40'. The baffle 40 extends on the inside of the bowl part of the way to the outside wall of the bowl 32. The baffle 40 on the outside of the circular end plate 30 extends over the separating adjustable wall 39 between the stationary receiving chambers 41 and 42. Adjustable circular openings 37A are provided in circular end plate 30 below the baffle 40 for discharging the heavier liquid and above the baffle adjustable circular openings 38 for discharging the lighter liquid. A pipe line 43 with a suitable valve 26 is provided to discharge the emulsion into the bowl 32 through circular openings 43A in shaft 34. The bowl 32 and the supporting web 33 are driven by a collar 34A and gear 34b from the motor shaft, and the gears (not shown) are so arranged that the bowl rotates in the same direction as the helix but at a slightly slower speed. The direction and speed of rotation of the helix relative to that of the bowl 32 is such that the helix will operate to discharge continuously through opening 37 at the tapered end of the bowl any solid material which would accumulate therein, for example the bowl may be driven at 890 R. P. M. and the helix at 900 R. P. M.

Separated oil is returned to doctor settling tanks 8 and 9 by means of pipe lines 46A, 10 and 11 with pump 12, from tank 46 or it may run to storage tank 13. The separated spent doctor from tank 47 is pumped by means of pump 48 through pipe line 49 to preliminary agitator or aerator 50, where it is agitated by means of air introduced through pipe line 51. The aerated doctor is then pumped to regenerator 52 by means of pump 53 and pipe line 54. The doctor in regenerator 52 is agitated by air from air line 55 and then run to settler 56 by means of pipe line 57. The excess lead sulphide in settler 56 is returned by means of pipe line 58 and pump 59 to regenerator 52. The regenerated doctor solution is now returned to storage tank 5 by means of pipe line 60 which is controlled by float valve 61 or it may be returned to tank 47 by means of pipe line 62 to pass once more through regenerating process.

In the operation of the apparatus described and illustrated in accordance with the improved process of the invention, the oil to be treated is introduced in the mixer 2 together with the doctor solution. The mixture is allowed to settle and stratify in the series of settlers 7, 8 and 9. The oil is removed to storage and the spent doctor solution is settled and stratified in settlers 21 and 22, the oil and spent doctor solution being separated and run to different storage tanks 46 and 47 and the emulsion run into the centrifuge 29. The speed of centrifuge 29 is a factor in determining if the emulsion is to be separated into two or three parts. When the centrifuge is operated at a low rate of speed a separation in two parts takes place, one containing spent doctor solution with lead sulphide, and the other oil with or without lead sulphide. If the centrifuge 29 is operated at a higher rate of speed such as 800 to 1200 R. P. M. for the element 35 and a lower rate of speed for the bowl 32 a three way separation takes place, spent doctor being removed to chamber 47, oil to chamber 46, and the solid lead sulphide is continuously removed through the tapered end of the centrifuge. The oil is returned to the settling tanks 8 and 9. The spent doctor is now regenerated in aerator 50 and regenerator 52 and finally removed to storage.

Having thus described my invention and the method of carrying it out, what I claim is:

1. The improvement in the separation of oil from the emulsion formed in the treatment of petroleum oil or distillate with sodium plumbite solution, comprising the subjecting of the emulsion to centrifugal force whereby the oil, sodium plumbite solution and lead sulphide are separated into layers, mechanically discharging the lead sulphide in a continuous manner from the zone in which it is subjected to centrifugal force at one point and continuously discharging the separated oil and sodium plumbite solution from said zone with movement toward the axis of rotation at other points.

2. The improvement in the separation of oil from the emulsion formed in the treatment of petroleum oil or distillate with sodium plumbite solution, comprising the subjecting of the emulsion to centrifugal force whereby the oil, sodium plumbite solution and lead sulphide are separated into layers, mechanically discharging the lead sulphide in a continuous manner from the zone in which it is subjected to centrifugal force at one point and continuously discharging the oil and sodium plumbite solution from said zone at other points.

3. The improvement in the separation of oil from the emulsion formed in the treatment of petroleum oil or distillate with sodium plumbite solution, comprising the subjecting of the emulsion to centrifugal force whereby the oil, sodium plumbite solution and lead sulphide are separated into layers, mechanically discharging the lead sulphide in a continuous manner from the zone in which it is subjected to centrifugal force at one point and continuously discharging the separated oil and sodium plumbite solution from said zone at another location by interposition of a baffle adapted to separate the oil and sodium plumbite as they emerge from the centrifugal zone.

4. The improvement in the separation of oil from the emulsion formed in the treatment of petroleum oil or distillate with sodium plumbite solution, comprising the separation of an emulsion of sodium plumbite, lead sulphide and oil from oil and sodium plumbite, the subjecting of the emulsion to centrifugal force whereby the oil, sodium plumbite solution and lead sulphide are separated into layers, mechanically discharging the lead sulphide in a continuous manner from the zone in which it is subjected to centrifugal force at one point, continuously discharging the separated oil and sodium plumbite solution from said zone at other points, and regenerating the spent doctor solution.

5. The improvement in the separation of oil from the emulsion formed in the treatment of petroleum oil or distillate with sodium plumbite solution, comprising the separation of an emulsion of lead sulphide, sodium plumbite and oil from sodium plumbite and oil, the subjecting of the emulsion to centrifugal force whereby the oil, sodium plumbite solution and lead sulphide are separated into layers, mechanically discharging the lead sulphide in a continuous manner from the zone in which it is subjected to centrifugal force at one point, continuously discharging the oil and sodium plumbite solution from said zone at other separate points, and regenerating the separated sodium plumbite solution.

6. The improvement in the separation of oil from the emulsion formed in the treatment of petroleum oil or distillate with sodium plumbite solution, comprising the separation of an emulsion of sodium plumbite, lead sulphide and oil from sodium plumbite and oil, the subjecting of the emulsion to centrifugal force whereby the oil, sodium plumbite solution and lead sulphide are separated into layers, mechanically discharging the lead sulphide in a continuous manner from the zone in which it is subjected to centrifugal force at one point, continuously discharging the separated oil and sodium plumbite solution from said zone at another point where the oil is separated from the sodium plumbite solution by the interposition of a baffle adapted to separate the oil and sodium plumbite as they emerge from the centrifugal zone, and continuously regenerating the separated sodium plumbite solution.

7. The improvement in the separation of oil from the emulsion formed in the treatment of petroleum oil or distillate with sodium plumbite solution, comprising continuously subjecting the emulsion to centrifugal force whereby the oil with lead sulphide in suspension and without sodium plumbite solution, the liquid sodium plumbite solution with lead sulphide in suspension and without oil, and a fraction of lead sulphide are separated into layers, causing the said oil with lead sulphide to move axially in the zone in which it is subjected to centrifugal force, causing the said sodium plumbite solution with lead sulphide also to move axially in said zone, causing the fraction of lead sulphide also to move axially in said zone and at the same time subjecting the separate layer of the fraction of lead sulphide to a mechanical force to move it out of said zone, discharging the said oil with lead sulphide in a continuous manner from said zone in which it is subjected to centrifugal force at one point and continuously discharging the said sodium plumbite solution with lead sulphide from said zone at another point.

8. The improvement in the separation of oil from the emulsion formed in the treatment of petroleum oil or distillate with sodium plumbite solution, comprising the separation of an emulsion of lead sulphide, sodium plumbite and oil from sodium plumbite and oil, continuously subjecting the emulsion to centrifugal force whereby the oil with lead sulphide without sodium plumbite solution, the liquid sodium plumbite solution with lead sulphide in suspension and without oil, and a fraction of lead sulphide are separated into layers, causing the said oil with lead sulphide to move axially in the zone in which it is subjected to centrifugal force, causing the said sodium plumbite solution with lead sulphide also to move axially in said zone, causing the said fraction of lead sulphide also to move axially in said zone and at the same time subjecting the separate layer of the fraction of lead sulphide to a mechanical force to move it out of said zone, discharging the said oil with lead sulphide in a continuous manner from said zone in which it is subjected to centrifugal force at one point, continuously discharging the said sodium plumbite solution with lead sulphide from said zone at another point, and continuously regenerating the separated sodium plumbite solution with lead sulphide.

9. In the recovery of doctor solution, the improvement which comprises settling the doctor solution after treating oil with the same, centrifuging, in a centrifuge having a rotor within a rotating bowl, the emulsion of the oil, caustic soda, and lead sulphide obtained by the settling, maintaining a differential speed between the bowl and the rotor of the centrifuge, and controlling the differential to obtain a two-way or a three-way separation between the components of the emulsion.

HERBERT G. M. FISCHER.